United States Patent [19]

Karmell

[11] 4,143,092

[45] Mar. 6, 1979

[54] POLYURETHANE-DERIVED PLASTICIZER FOR POLYACRYLONITRILE PRINTING ROLLS

[75] Inventor: Yale Karmell, Chicago, Ill.

[73] Assignee: Samuel Bingham Company, Franklin Park, Ill.

[21] Appl. No.: 835,443

[22] Filed: Sep. 21, 1977

Related U.S. Application Data

[62] Division of Ser. No. 652,419, Jan. 26, 1976, abandoned.

[51] Int. Cl.² .................... C08L 75/04; B29H 19/00; B05B 1/08
[52] U.S. Cl. .................... 260/859 R; 29/132; 101/348; 260/31.2 N; 260/31.8 AN; 260/31.8 G; 260/37 N; 528/46
[58] Field of Search ............ 260/31.2 N, 31.8 AN, 260/31.8 G, 2.3, 859 R

[56] References Cited

U.S. PATENT DOCUMENTS

| | | | |
|---|---|---|---|
| 2,917,471 | 12/1959 | Nelson | 260/2.3 |
| 2,937,151 | 5/1960 | Ten Broeck et al. | 260/2.3 |
| 3,109,824 | 11/1963 | Heiss | 260/2.3 |
| 3,117,940 | 1/1964 | McElroy | 260/2.3 |
| 3,404,103 | 10/1968 | Matsudaiva et al. | 260/2.5 BD |
| 3,708,440 | 1/1973 | Frulla et al. | 260/2.3 |
| 3,925,272 | 12/1975 | Ibata et al. | 260/31.8 DR |

OTHER PUBLICATIONS

DAS 1,150,802 – Metzeler Summiwerke A/G 6-27-63.
Athey–Liquid Urethane Elastomers, Rubber Age, vol. 85, No. 1/Apr. 1959, pp. 77–81.
Europlastics Monthly, Jun. 1972, p. 8.

*Primary Examiner*—H.S. Cockeram
*Attorney, Agent, or Firm*—McCaleb, Lucas & Brugman

[57] ABSTRACT

A new use for the liquid reaction product of a polyurethane and an amine or alkanol amine at an elevated temperature as a plasticizer for acrylonitrile rubbers in combination with certain ester plasticizers which make the otherwise incompatible reaction products compatible with the acrylonitrile elastomer, and a printing roller composition incorporating the reaction product as a plasticizer.

8 Claims, No Drawings

POLYURETHANE-DERIVED PLASTICIZER FOR POLYACRYLONITRILE PRINTING ROLLS

CROSS REFERENCE TO RELATED APPLICATION

This application is a division of application Ser. No. 652,419 filed Jan. 26, 1976 and now abandoned.

BACKGROUND OF THE INVENTION

In the printing roller industry, rollers are commonly fabricated of both cast polyurethanes and acrylonitrile rubbers. Each has its place and its particular suitabilities for various ink or other fluid transfer processes.

In the manufacture of rollers, there will inevitably be scrap in the way of defective rollers, trimmings, grindings, etc. Hitherto, the polyurethane scrap of this character was simply discarded.

SUMMARY OF THE INVENTION

It has been found that reacting scrap polyurethanes with amines or alkanolamines gives rise to a viscous liquid useful as a plasticizer in acrylonitrile rubber compounds.

A preferred acrylonitrile rubber for printing rollers is a copolymer of acrylonitrile and butadiene, conventionally sulphur-cured. To obtain the desired physical properties of the roller, the acrylonitrile-butadiene rubber, unmodified, will cure to a Shore hardness of about 60 on the "A" scale. This hardness is excessive for many ink or other fluid transfer operations. It is therefore necessary to incorporate in the rubber mix a plasticizer to reduce the hardness to about 20 to 50 on the Shore "A" scale.

Not all plasticizers are adaptable for use with acrylonitrile rubbers. A majority of them are incompatible; they do not incorporate integrally into the rubber material but ooze from the surface as if from a fine-pored sponge, making the roller sticky and unusable. Compatible plasticizers are incorporated integrally into the rubber and do not ooze from it. The compatible plasticizers, notably the esters such as dioctyl phthalate, dibutyl phthalate, dioctyl adipate, and dioctyl sebacate, are among the most expensive.

The ink vehicles and roll cleaning compounds are highly effective solvents for most plasticizer materials including the esters. As a consequence, the plasticizers are slowly leached out of the roll and the roll becomes progressively harder and fails increasingly to perform its function. The leaching is not to be confused with the oozing of incompatible plasticizers. The oozing represents a fast loss of unretained plasticizer which would be accelerated by working of the rubber roll incident to use (were such a roll useful).

The amine-treated polyurethane described above provides a plasticizer useful, in combination with one of the above mentioned esters, for acrylonitrile rubbers. In itself, it is not compatible with these rubbers, but in combination with an ester it does integrate into the roll and has the unusual characteristic of being substantially extraction-proof. A roll so plasticized may lose some of its ester in the course of use, but the amine-treated polyurethane stays incorporated in the substance of the roll, and thus dimensional stability and softness to the extent attributable to the amine-treated polyurethane remain permanent characteristics in rolls thus far tested.

This high quality plasticizer not only provides superior performance, but is available to the manufacturer at greatly reduced cost in that the polyurethane scrap is an ever-present product, and the cost of the amine reactant and the processing is substantially less than the next most suitable plasticizers.

DESCRIPTION OF A PREFERRED EMBODIMENT

Cast polyurethane elastomers suitable for printing rollers are polyester or polyether based and cured with toluene diisocyanate, phenylene diisocyanate, triphenylmethane triisocyanate, etc.

A common specific polyurethane employed for rollers in the printing business is toluene diisocyanate-cured polydiethylene glycol adipate.

The polyurethane will, of course, generally have urethane linkages at the terminal hydroxyl groups of the polyester, so that the number of urethane linkages will be determined by the hydroxyl number of the polyester. It is believed that the amine reacts with the urethane linkage at the site of the former terminal hydroxyl group, now the urethane linkage, although the precise nature of the reaction is not known. In any case, the amine should be introduced in sufficient quantity to provide an amine group ($-NR_1R_2$) for each of the urethane linkages determined by the hydroxyl number of the polyester. The amines employed have been dibutylamine, dibenzylamine, diethanolamine, and butylbenzylamine. These amines have the characteristic of being liquid at room temperatures and have a boiling point sufficiently high to withstand the reaction temperature without vaporization.

The polyurethane is chopped and mixed with the approximate amine-equivalent weight of amine or alkanolamine as determined by the hydroxyl number of the polyester and heated to a temperature of 300° F. (140° C.) for a period of eight to forty-eight hours. At the end of this reaction time, the polyurethane will have been totally reduced to the aforementioned viscous liquid which thereafter can be employed in combination with an ester as a plasticizer for the acrylonitrile rubber compounds.

The urethane scrap may be derived from unfilled or filled polyurethanes. The presence of filler, generally silica, simply reduces the amount of amine or alkanolamine necessary per pound of urethane without affecting the plasticizing value of the reaction product. The reaction product is functionally and physically the same whether the urethane is derived from a one shot process or from a prepolymer reacted with an amine or polyol curative. Again, the urethane (and substituted urea) linkages must be determined and the amine added approximately stoichiometrically.

A representative batch for the process is as follows:

2,000 lbs. unfilled polydiethylene glycol adipate, toluene diisocyanate-cured.

105 lbs. diethanolamine.

The urethane is chopped, the reactants mixed and heated to about 300° F. Depending on the fineness of the urethane pieces, the reaction will be complete in 8 to 48 hours. If the urethane is filled with 40% filler, the filled urethane is increased to 3,400 lbs. for the same amount of diethanolamine. If the amine or alkanolamine is added in substantially less than stoichiometric amounts, the urethane will be liquified until the amine reactant is exhausted. The residual pieces of urethane will then remain unchanged. They may be filtered out of the converted urethane reaction product for separation. Thus the reaction product is approximately stoichiometric.

Lower molecular weight amines or alkanolamines than those specified above may be employed as reactants providing the reaction chamber is sealed to prevent the loss of amine by vaporization at the reaction temperature.

An illustrative formulation for a general purpose printing roller constructed in accordance with this invention is equal proportions by weight of dioctyl phthalate and the amine-treated polyurethane in the proportion of 36% of the combined plasticizers to 64% uncured acrylonitrile with its appropriate vulcanizing agents. This formulation is mixed and cured by traditional industry processes.

Obviously, it is advantageous to substitute as much of the amine-treated polyurethane for the ester plasticizer as possible, both from the point of view of cost and from the point of view of superior extraction resistance. A limit to this substitution lies at the point where the amine-treated polyurethane demonstrates incompatibility with the roll material. Equal parts of the ester and polyurethane represent a safe, all-purpose proportioning of these two components. It is possible to increase the proportion of polyurethane up to a maximum of about 75%, depending on the proportion of the combined plasticizer employed in combination with the acrylonitrile-butadiene rubber, and with the specific formulation of that rubber. A less total proportion of plasticizer would permit a greater relative proportion of polyurethane to be used.

The proportion of total plasticizer to the rubber, of course, will depend on the degree of softening desired for any specific application.

The presence of the filler such as silica and the like in the amine-treated polyurethane may be regarded as essentially an "empty" factor; the net quantity of polyurethane in the polyurethane-filler mix is considered in arriving at the above proportions. Where amine-treated filled polyurethane is employed, the proportion of polyurethane to ester should be increased to compensate for the proportion of filler present. The filler in the polyurethane has negligible effect on the ultimate hardness of the roll.

In the claims hereof, the term "amine" will be understood to include alkanolamines which, of course, they are, both functionally in the present reaction, and descriptively.

The embodiments of the invention in which an exclusive property or privilege is claimed are defined as follows:

1. A method for modifying the hardness of an acrylonitrile rubber which comprises mixing with the rubber prepolymer and curing agents a proportion of plasticizer sufficient to modify the hardness of the cured rubber to the desired degree and curing the rubber-plasticizer mix, said plasticizer comprising a mixture, by weight of from 25% to 75% of an ester plasticizer and from 75% to 25% of the viscous liquid reaction product of a polyurethane elastomer with an amine at an elevated temperature, said ester plasticizer having the general compatibility characteristics, with respect to said rubber and said polyurethane reaction product, of dioctyl phthalate, dibutyl phthalate, dioctyl adipate, and dioctyl sebacate.

2. The method as set forth in claim 1 wherein said amine is taken from the group consisting of dibutylamine, dibenzylamine, diethanolamine, and butylbenzylamine.

3. The method as defined in claim 1 wherein said polyurethane is a diisocyanate-cured polyester.

4. The method as defined in claim 1 wherein said plasticizer mixture comprises approximately equal parts of ester and said polyurethane reaction product.

5. A printing roller composition comprising an acrylonitrile elastomer, a vulcanizing agent in sufficient proportion to vulcanize said elastomer, and a mixed plasticizer, comprised, by weight, of from 25 to 75% of an ester plasticizer and from 75 to 25% of the viscous liquid reaction product of a polyurethane elastomer with an amine at an elevated temperature, in sufficient proportion relative to said elastomer to produce a composition hardness of from 20 to 50 on the Shore "A" scale when vulcanized.

6. The combination as set forth in claim 5 wherein said mixed plasticizer is comprised of approximately equal parts of said ester plasticizer and said reaction product and comprises in turn approximately 36% of said composition.

7. The combination as set forth in claim 5 wherein said ester plasticizer is taken from the group consisting of dioctyl phthalate, dibutyl phthalate, dioctyl adipate, and dioctyl sebacate.

8. The combination as set forth in claim 5 wherein said amine is taken from the group consisting of dibutylamine, dibenzylamine, diethanolamine and butylbenzylamine.

* * * * *